(12) United States Patent
Veit et al.

(10) Patent No.: US 10,711,850 B2
(45) Date of Patent: Jul. 14, 2020

(54) FREEWHEEL AND METHOD FOR PRODUCING SUCH A FREEWHEEL

(71) Applicant: BorgWarner Inc., Auburn Hills, MI (US)

(72) Inventors: Matthias Gerhard Veit, Oftersheim (DE); Frederik Johann Metzdorf, Ludwigshafen (DE); Kay Rapp, Ladenburg (DE)

(73) Assignee: BorgWarner Inc., Auburn Hills, MI (US)

( * ) Notice: Subject to any disclaimer, the term of this patent is extended or adjusted under 35 U.S.C. 154(b) by 329 days.

(21) Appl. No.: 15/476,132

(22) Filed: Mar. 31, 2017

(65) Prior Publication Data

US 2017/0284480 A1 Oct. 5, 2017

(30) Foreign Application Priority Data

Apr. 2, 2016 (DE) .......................... 10 2016 004 031

(51) Int. Cl.
*F16D 41/066* (2006.01)
*F02N 15/02* (2006.01)
*B21K 1/30* (2006.01)
*F16D 41/067* (2006.01)
*F02N 11/00* (2006.01)

(52) U.S. Cl.
CPC .............. *F16D 41/066* (2013.01); *B21K 1/30* (2013.01); *F02N 15/023* (2013.01); *F02N 11/00* (2013.01); *F02N 15/025* (2013.01); *F16D 41/067* (2013.01)

(58) Field of Classification Search
CPC ....... F16D 41/066; F16D 41/067; B21K 1/30; F02N 15/023; F02N 15/025; F02N 11/00
See application file for complete search history.

(56) References Cited

U.S. PATENT DOCUMENTS

| | | | |
|---|---|---|---|
| 2005/0284720 A1* | 12/2005 | Ogata .................... | F16D 41/066 192/45.018 |
| 2008/0047796 A1* | 2/2008 | Ogata .................... | F16D 41/066 192/45.018 |
| 2011/0048886 A1* | 3/2011 | Yamamoto ............ | F16D 41/066 192/45.011 |
| 2011/0253497 A1* | 10/2011 | Tamura ................. | F16D 41/066 192/45.02 |
| 2015/0159707 A1* | 6/2015 | Boelling ............... | F16F 15/124 192/45.003 |
| 2017/0122385 A1* | 5/2017 | Aramoto ............... | F16D 41/066 |
| 2017/0122386 A1* | 5/2017 | Veit ....................... | F16D 41/066 |
| 2017/0248176 A1* | 8/2017 | Keating ................. | F16D 41/12 |
| 2017/0254373 A1* | 9/2017 | Hodge .................. | F16D 41/067 |
| 2018/0259010 A1* | 9/2018 | Ji ........................... | F16D 41/06 |

* cited by examiner

*Primary Examiner* — David J Hlavka
(74) *Attorney, Agent, or Firm* — Howard & Howard Attorneys PLLC

(57) ABSTRACT

The present invention relates to a freewheel (2) comprising an inner ring (30), an outer ring (28), a clamping gap (32) between the inner ring (30) and the outer ring (28), a side wall (40) for lateral limitation of the clamping gap (32) and at least one clamping element (34) in the clamping gap (32) which is biased by means of a spring element (66), wherein the spring element (66) is supported or supportable on one side on the clamping element (34) and on the other side on a support projection (70), which is formed by a supporting tongue (74) bent out of the side wall (40) and projecting into the clamping gap (32). In addition, the present invention relates to a method for producing such a freewheel (2).

25 Claims, 9 Drawing Sheets

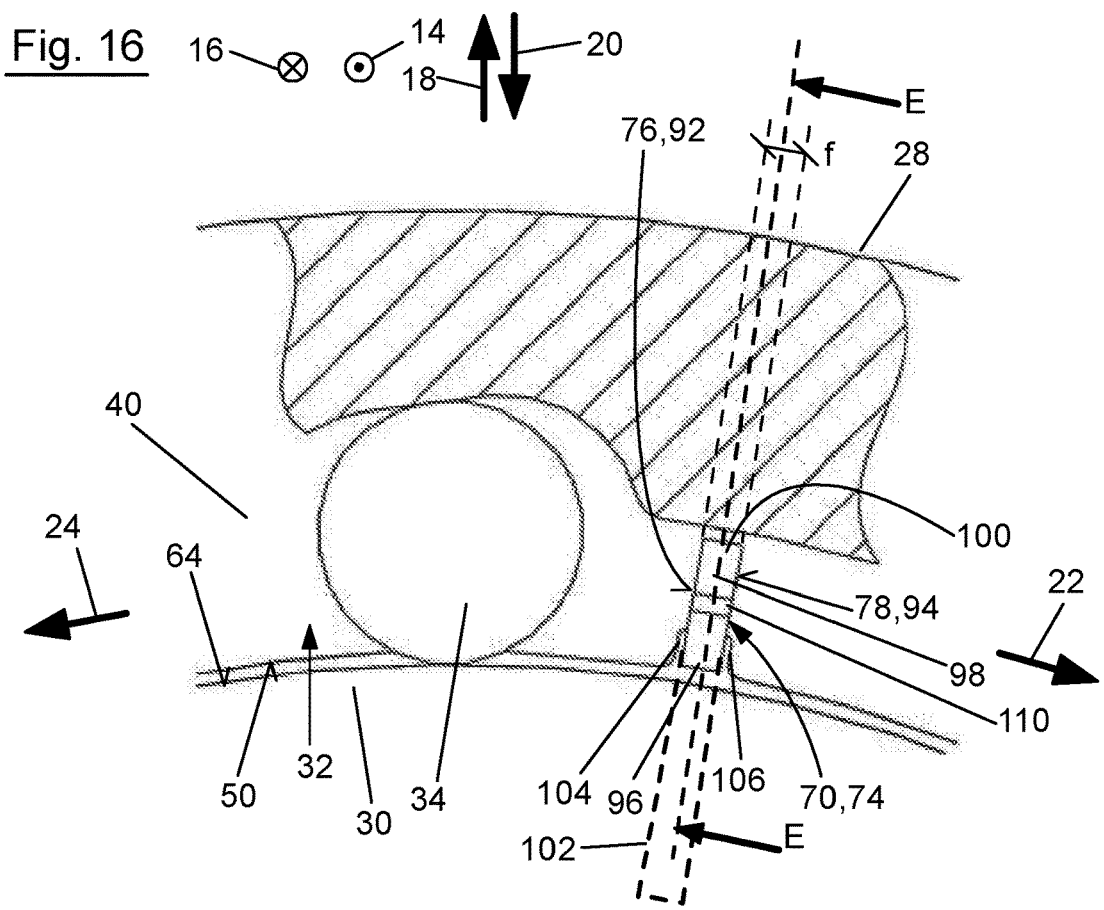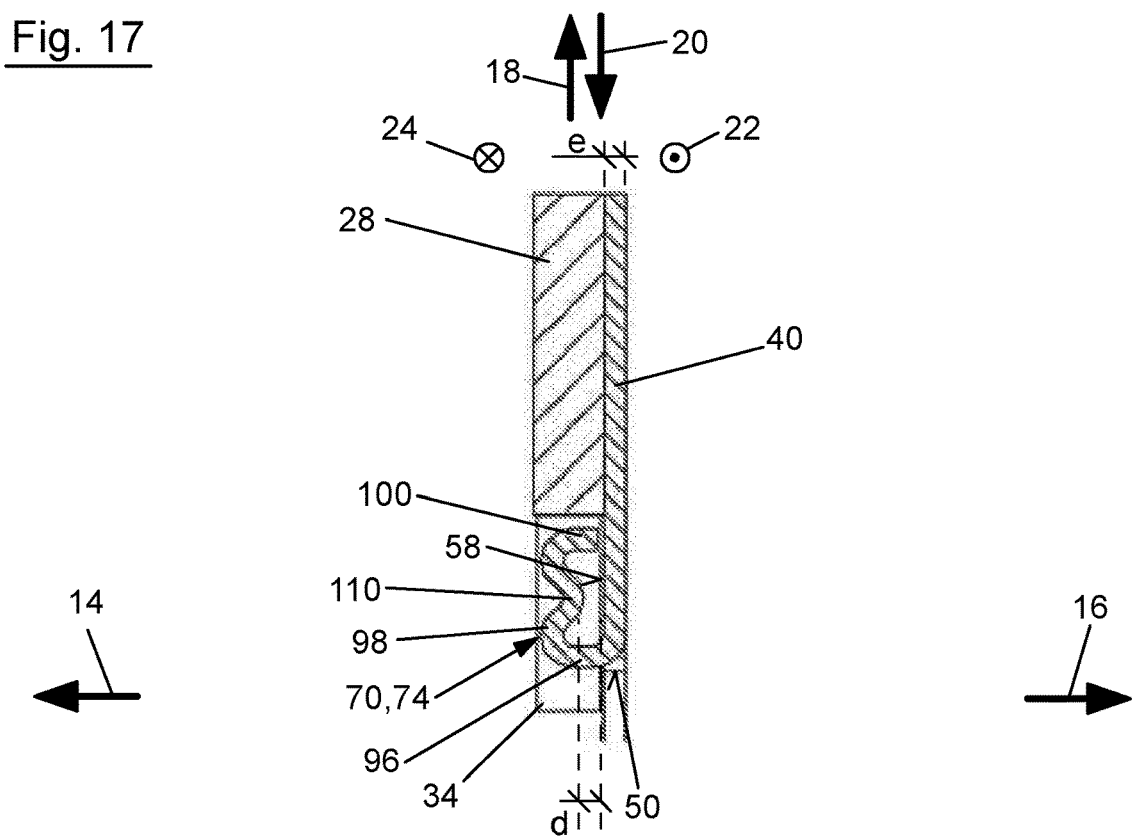

FREEWHEEL AND METHOD FOR PRODUCING SUCH A FREEWHEEL

CROSS-REFERENCE TO RELATED APPLICATIONS

This application claims the benefit of German Patent Application No. 102016004031.9 filed on Apr. 2, 2016, the disclosure of which is herein incorporated by reference in its entirety.

FIELD OF THE INVENTION

The present invention relates to a freewheel comprising an inner ring, an outer ring, a clamping gap between the inner and outer ring, and a side wall for lateral limitation of the clamping gap, wherein at least one clamping element, biased by means of a spring element, is arranged in the clamping gap. In addition, the present invention relates to a method for producing such a freewheel.

BACKGROUND

Freewheels are known from experience which have an inner ring, an outer ring, a clamping gap in the radial direction between the inner ring and the outer ring, and at least one side wall for lateral limitation of the clamping gap, in which at least one clamping element is arranged. The clamping element is biased by means of a spring element, wherein the spring element is supported or supportable on the one side on the clamping element and on the other side on a support projection, which is designed as a projection on the inner or outer ring.

The previously described prior art has proven itself; however, it is in need of improvement insofar as the freewheel has a relatively expensive design and a relatively expensive manufacturing.

It is therefore the object of the present invention to refine a freewheel of the generic type in such a way that it has a simple design and may be easily manufactured. In addition, the underlying object of the present invention is to specify a method for simplified manufacturing of such a freewheel.

SUMMARY OF THE INVENTION

This problem is solved by the features listed in Patent claim 1 or 14. Advantageous embodiments of the invention are the subject matter of the subclaims.

The freewheel according to the invention has an inner ring, an outer ring, and a clamping gap between the inner ring and the outer ring. The inner ring and the outer ring are preferably designed as annular disk-shaped metal parts or sheet metal parts to ensure a low axial installation space requirement of the freewheel. The clamping gap formed between the inner ring and outer ring is preferably formed continuously peripherally in the circumferential direction. At least one clamping element is provided within the clamping gap, wherein in the case of multiple clamping elements, a uniform distribution of the clamping elements is preferably provided in the circumferential direction. The clamping element may fundamentally have any outer contour; however, it is preferred if the clamping element has a circular outer contour and consequently is formed as a clamping roller. The clamping element is biased by means of a spring element, wherein the spring element is preferably an accordion spring. The freewheel additionally has at least one side wall for lateral limitation of the clamping gap, wherein the side wall may limit the clamping gap, for example, in one of the axial directions. For the purpose of biasing the clamping element, the previously-mentioned spring element is supported or supportable on the clamping element on one side and on a support projection on the other. Both the support on the clamping element and also the support on the support projection may hereby be carried out directly or indirectly; although the direct support on the clamping element on the one side and the support projection on the other side is preferred in the sense of a simple and compact structure. In the case of the freewheel, the support projection is formed from a supporting tongue bent out of the side wall and projecting into the clamping gap. Such a supporting tongue may be produced relatively easily, in that, for example, a tongue is cut or stamped out of the side wall formed as a sheet metal part before this tongue is formed by bending into the supporting tongue for the spring element. In addition, a particularly space-saving and compact structure is achieved, particularly as the supporting tongue may be generated directly adjacent to its point of use for supporting the spring element, whereas in other known solutions, a corresponding projection has to be generated on the inner ring or the outer ring in an expensive way. In addition, a support projection may be created in this way which is spaced radially apart from both the inner ring and from the outer ring and is thus constructed not only to be small, but may also be engaged by the spring element in both the outward radial direction and in the inward radial direction.

In a preferred embodiment of the freewheel according to the invention, a support section of the supporting tongue, arranged in the clamping gap, has a supporting surface for the spring element facing the clamping element and/or facing away from the clamping element.

In a particularly preferred embodiment of the freewheel according to the invention, the support surface, which faces the clamping element and/or faces away from the clamping element, of the support section of the supporting tongue arranged in the clamping gap is designed as uncurved and/or arranged completely in an uncurved plane to effect a particularly secure support of the spring element on the support section of the supporting tongue arranged inside of the clamping gap. This is advantageous in particular in the case of a so-called accordion spring, particularly as a corresponding longitudinally extended leg of the according spring may then be supported or supportable particularly securely on the support surface, which faces the clamping element and/or faces away from the clamping element, on the support section of the supporting tongue arranged in the clamping gap.

In an advantageous embodiment of the freewheel according to the invention, the uncurved plane, in which the support surface facing the clamping element and/or facing away from the clamping element is arranged, extends from an axial direction and a radial direction of the freewheel.

In a particularly advantageous embodiment of the freewheel according to the invention, the supporting tongue is bent in such a way that the support surface facing the clamping element and/or facing away from the clamping element is formed from an upper side and/or a lower side of the supporting tongue to achieve a well-defined support surface for the spring element. In this embodiment, it is further preferred if the supporting tongue is bent out of the side wall around a bending axis extending essentially in the radial direction.

In another preferred embodiment of the freewheel according to the invention, in which the support surface facing the clamping element and/or facing away from the clamping element is formed from an upper side and/or a lower side of the supporting tongue, the supporting tongue has a transition section between the side wall and the support section of the supporting tongue arranged in the clamping gap arranged outside of the clamping gap, wherein the transition section is recessed at least partially with respect to the inner side of the side wall facing the clamping gap. In contrast to a supporting tongue, which would be directly bent into the clamping gap—thus in this case also comprising the indicated transitions section—this has the advantage that due to the recessed transition section, the support section of the supporting tongue may be arranged in the clamping gap in such a way that the support surface of the support section facing the clamping element and/or facing away from the clamping element may not have any curve, which may ultimately lead to an insecure support or supportability of the spring element on at least one of the support surfaces.

In another advantageous embodiment of the freewheel according to the invention, which is based on the previously-described embodiment, the transition section is bent or curved away from the inner side of the side wall facing the clamping gap to effect the previously-mentioned recessing.

According to another advantageous embodiment of the freewheel according to the invention, the previously-mentioned transition section has a U-shaped, curved, or circular arc shaped progression between the side wall and the support section of the supporting tongue.

In another preferred embodiment of the freewheel according to the invention, the supporting tongue is bent out of the side wall while creating a recess in the side wall. Regardless of the arrangement of such a recess in the side wall, the recess initially has the advantage that a light-weight structure may be achieved, wherein a good supply and removal of lubricant is additionally possible if a corresponding lubricant is to be present in the clamping gap. In this embodiment, the recess may be formed—depending on the direction of the bending of the supporting tongue—either essentially on the side of the supporting tongue facing the clamping element or on the side of the supporting tongue facing away from the clamping element inside of the side wall. A recess provided in the side wall on the side of the supporting tongue facing the clamping element would have the already-mentioned advantage that a good supply and removal of lubricant is possible in the area of the spring element. A recess formed within the side wall essentially on the side facing away from the clamping element would have, in contrast, the advantage that the spring element might also be supported on the inner side of the side wall without risking a collision with the edges of the recess in this case, which might ultimately lead to higher wear on the spring element. Consequently, the last-mentioned embodiment variant is to be preferred, in particular if the spring element is to be the already claimed accordion spring.

In another advantageous embodiment of the freewheel according to the invention, the recess extends up to the inner or outer edge of the side wall, so that this recess is formed, if necessary, as a type of notch on the inner or outer wall. This embodiment of advantageous, insofar as the supporting tongue may be generated relatively easily, consequently simply configured, for example, as a cutting or stamping process for the supporting tongue prior to the bending out of the side wall.

According to another advantageous embodiment of the freewheel according to the invention, which presents an alternative to the previously-described embodiment, the recess is formed at a distance from the inner and outer edge of the side wall and, if necessary, as a type of window. It has been shown that, by this means—in contrast to the previously described notch-like recess—a particularly stable side wall may be created, even if the cutting or stamping of the support tongue out of the side wall becomes somewhat more expensive.

As already previously mentioned, the recess in another advantageous embodiment of the freewheel according to the invention is arranged in the side wall essentially on the side of the supporting tongue facing or facing away from the clamping element, wherein reference is made to the preceding description with respect to the advantages of the respective embodiment variants.

In another advantageous embodiment of the freewheel according to the invention, the side wall is composed of at least two layers, from a first wall facing the clamping gap and a second wall facing away from the clamping gap, wherein the supporting tongue is bent out of the second wall and projects into the clamping gap through a recess in the first wall. Due to this construction, a separation of the, if necessary, curved transition section is already guaranteed between the second wall and the support section of the supporting tongue arranged in the clamping gap, based on the thickness of the first wall, so that a hypothetically-present curve of the transition section does not risk or influence a secure support of the spring element on the support section of the supporting tongue arranged in the clamping gap.

In another advantageous embodiment of the freewheel according to the invention, the supporting tongue, bent out of the second wall of the side wall, extends additionally through a recess in at least one additional wall of the side wall, arranged between the first and second wall of the side wall, to project into the clamping gap, if the side wall is designed from three or more layers.

In another particularly advantageous embodiment of the freewheel according to the invention, the supporting tongue is bent in such a way that the support surface facing the clamping element and/or facing away from the clamping element is formed by a side edge of the supporting tongue. It is preferred in this case if the supporting tongue is bent essentially around a bending axis extending in the circumferential direction of the freewheel. With regard to a supporting tongue, in which the support surface facing the clamping element and/or facing away from the clamping element is formed by a side edge of the supporting tongue, then a particularly stable support of the spring element may be achieved; in addition, the production costs may be reduced by this means. In addition, it is possible to vary the distance between the support surface facing the clamping element and the support surface facing away from the clamping element of the support section arranged in the clamping gap, without the thickness of the side wall representing a limitation in this regard.

In another advantageous embodiment of the freewheel according to the invention, the supporting tongue has a first section projecting over the inner side of the side wall facing the clamping gap and a second section connecting to the first section and extending essentially in the radial direction. The second section may thereby be, for example, spaced apart from the inner side of the side wall.

In another advantageous embodiment of the freewheel according to the invention, the supporting tongue has a third section connecting to the second section and extending essentially in the direction of the inner side of the side wall to enlarge the support surface formed by the side edge of the supporting tongue. It is hereby preferred if the third section extending in the direction of the inner side of the side wall is supported or supportable on the inner side of the side wall to achieve a particularly stable supporting tongue to support the spring element.

To further enlarge the support surface formed by the side edge of the supporting tongue, the supporting tongue has, in another advantageous embodiment of the freewheel according to the invention, a fourth section connecting to the third section of the supporting tongue and extending essentially in the radial direction between the second section and the side wall. It is hereby preferred if the fourth section of the supporting tongue is supported or supportable on the inner side of the side wall to further increase the stability of the supporting tongue.

To increase not only the size of at least one of the support surfaces for the spring element, but also to increase the stability of the supporting tongue, the side edge of the second section and/or of the fourth section of the supporting tongue deviates from a straight line course in another advantageous embodiment of the freewheel according to the invention.

In another advantageous embodiment of the freewheel according to the invention, which is based on the previously-described embodiment, the second and/or the fourth section of the supporting tongue has, for the purpose of achieving a course of the side edge deviating from a straight line, at least one section curved in the axial direction, or the second and/or fourth section is designed as completely curved in the axial direction.

As already previously indicated, a supporting tongue, in which the support surface facing the clamping element and/or facing away from the clamping element is formed by a side edge of the supporting tongue, enables a particular simple manufacturing. I.e., the supporting tongue in another advantageous embodiment of the freewheel according to the invention is bent or shaped from a tongue projecting in the radial direction above the inner or outer edge of the side wall. I.e., the supporting tongue projecting over the inner or outer edge of the side wall may already be created with the manufacturing of the side wall before said side wall is correspondingly bent or shaped, wherein an additional notching to create the tongue may be largely omitted.

In another advantageous embodiment of the freewheel according to the invention, a notch is provided in a transition area between the inner or outer edge of the side wall and the tongue, from which the supporting tongue has been bent or shaped. It is hereby preferred if a notch is respectively provided on both sides of the tongue projecting over the inner or outer edge. The notches have the advantage that the completely bent or shaped supporting tongue may be arranged relatively far within the clamping gap, without indicating a significantly larger manufacturing expense, particularly as the mentioned notches may already be or were jointly created during the cutting out of the side walls.

In another advantageous embodiment of the freewheel according to the invention, the supporting tongue, bent or shaped from the previously-mentioned tongue, is arranged in the radial direction completely between the inner and outer edge of the side wall, to prevent a projection of the supporting tongue, bent or shaped from the tongue, over the inner or outer edge of the side wall, which would present a design limitation for the configuration of the freewheel. This embodiment also includes freewheels in which the supporting tongue ends at the inner or outer edge.

As already previously explained, the advantage of a supporting tongue, in which the support surface facing the clamping element and/or facing away from the clamping element is formed by a side edge of the supporting tongue, consists in that by this means, a distance between the support surface facing the clamping element and the support surface facing away from the clamping element, which does not necessarily correspond to the thickness of the side wall, may be particularly easily adjusted. In another preferred embodiment of the freewheel according to the invention, a distance between the support surface facing the clamping element and the support surface facing away from the clamping element is therefore greater than or less than a thickness of the supporting tongue or of the side wall, if necessary of the previously-mentioned second wall of the side wall. If the stated distance is greater than the thickness of the supporting tongue or of the side wall, then a secure support is guaranteed due to a particularly stable supporting tongue. If the stated distance is less than the thickness of the supporting tongue or of the side wall, then a correspondingly more compact and space saving design may be achieved.

In another advantageous embodiment of the freewheel according to the invention, the side wall, if necessary also the first wall and/or the second wall and/or the additional wall of the side wall, is formed as a sheet metal part. It is hereby preferred if the side wall, if necessary also the first wall and/or the second wall and/or the additional wall of the side wall, is formed essentially as an annular disk-shaped sheet metal part.

In another advantageous embodiment of the freewheel according to the invention, the supporting tongue is formed as one piece with the side wall, if necessary with the second wall of the side wall.

In another advantageous embodiment of the freewheel according to the invention, the spring element is supported or supportable on the support surface of the supporting tongue facing the clamping element and/or on the support surface facing away from the clamping element.

In another advantageous embodiment of the freewheel according to the invention, the spring element is designed as an accordion spring. It is hereby preferred if a first spring leg of the accordion spring is supported or supportable on the support surface facing the clamping element and a second spring leg, if necessary adjacent to the first spring leg, is supported or supportable on the support surface facing away from clamping element. In addition, it is preferred in this embodiment if a spring section is provided between the first and second spring legs which radially outwardly bridges the support projection. In addition, the spring section between the first and second leg bridging the support projection radially outwardly may be supported or supportable radially outwardly on the outer ring.

The method according to the invention for producing a freewheel or a side wall with a supporting tongue of the type according to the invention has the following method steps. I.e., initially an essentially annular disk-shaped sheet metal part with at least one tongue projecting over the inner or outer edge of the annular disk-shaped sheet metal part is cut or stamped out of a metal sheet. It is hereby preferred if multiple tongues are generated projecting over the inner or outer edge of the annular disk-shaped sheet metal part, distributed particularly preferably uniformly in the circumferential direction. Subsequently, the tongue is bent, while creating a supporting tongue projecting over a side of the annular disk-shaped sheet metal part, comprising a support surface oriented in one circumferential direction which is formed by a side edge of the supporting tongue, and/or while creating a support surface oriented in the opposite circumferential direction which is formed by a side edge of the supporting tongue.

In a preferred embodiment of the method according to the invention, the sheet metal part is mounted on a provided outer or inner ring of the freewheel with the projection of the supporting tongue into an area radially inside of the outer ring or radially outside of the inner ring.

In another preferred embodiment of the method according to the invention, the cutting or stamping of the annular disk-shaped sheet metal part is carried out while generating a notch in a transition area between the inner and outer edge of the sheet metal part and the at least one tongue. It is hereby preferred if a corresponding notch is generated on both sides of the tongue.

According to a particularly preferred embodiment of the method according to the invention, the bending of the tongue takes place with at least partial, preferably complete arrangement of the supporting tongue between the inner and outer edge of the sheet metal part in the radial direction.

According to another advantageous embodiment of the method according to the invention, the bending of the tongue is carried out while supporting the supporting tongue on the side of the annular disk-shaped sheet metal part, preferably on that side of the annular disk-shaped sheet metal part which faces the clamping gap of the freewheel in the assembled state.

The invention will subsequently be explained in greater detail by means of exemplary embodiments with reference to the accompanying drawings.

BRIEF DESCRIPTION OF THE DRAWINGS

FIG. 16 shows a front view of the freewheel from FIG. 15 in a cutaway depiction, and FIG. 17 shows a cross-sectional view along line E-E in FIG. 16.

DETAILED DESCRIPTION OF THE INVENTION

Figure 1:
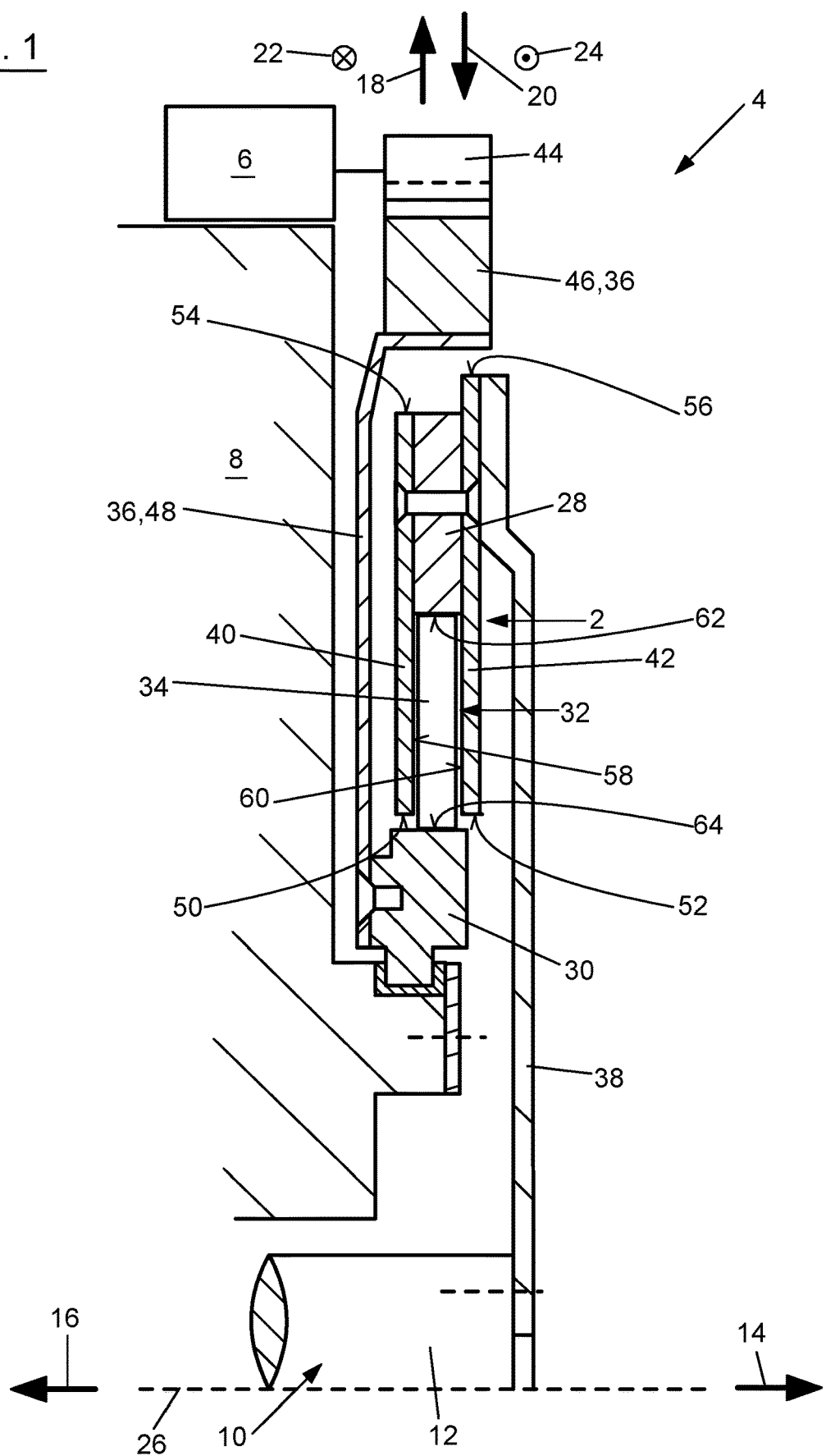
FIG. 1 shows a partial side view of an embodiment of the freewheel according to the invention in a freewheel arrangement in a cutaway depiction.
Figure 2:
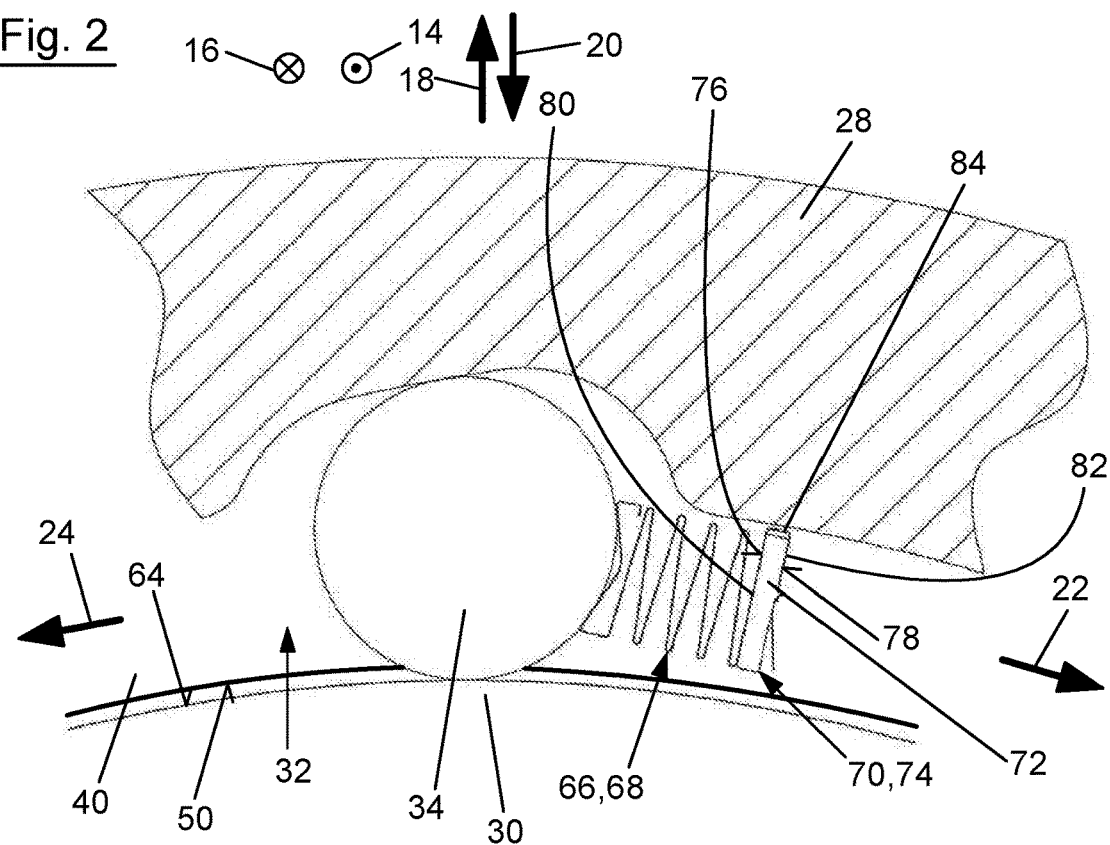
FIG. 2 shows a partial front view of the freewheel from FIG. 1.

FIGS. 1 and 2 initially show the general structure of the freewheel 2 within a freewheel arrangement 4 of a drive train of a motor vehicle. Freewheel 2 is designed as a starter freewheel 2. Freewheel arrangement 4 has, in addition to freewheel 2, a starter 6, which is only schematically indicated in FIG. 1, and a drive unit 8, the output side 10 of which is formed by an output shaft 12. Drive unit 8 may, for example, be an internal combustion engine so that output shaft 12 may also be referred to as a crankshaft.

In the figures, the opposite axial directions 14, 16, the opposite radial directions 18, 20, and the opposite circumferential directions 22, 24 of freewheel arrangement 4 and freewheel 2 are indicated by corresponding arrows. The axis of rotation 26 of output side 10 of drive unit 8 and freewheel 2 extend in axial directions 14, 16. Circumferential directions 22, 24 may also be designated as rotational directions.

Freewheel 2 has an outer ring 28 and an inner ring 30. Outer ring 28 is arranged outside of inner ring 30 in radial direction 18 so that outer ring 28 and inner ring 30 are arranged nested in radial direction 18, 20, and a clamping gap 32, continuous in circumferential direction 22, 24, is formed between outer ring 28 and inner ring 30. At least one clamping element 34 of freewheel 2 is arranged within clamping gap 32. Freewheel 2, designed as a starter freewheel, has additional components which are connected rotationally fixed to one of rings 28, 30 in rotary driving connection. These additional components are a starter wheel 36, a drive gear 38, a first side wall 40 and a second side wall 42, wherein the listed components are to be subsequently described in greater detail.

Starter wheel 36 is designed as a torque transfer element and functions to transfer torque between an output side 44 of starter 6, which is formed here as a pinion drivable by starter 6, and inner ring 30. Starter wheel 36 is composed essentially from an outer ring gear 46, whose toothing is permanently in rotary driving engagement with the toothing of the pinion forming output side 44 of starter 6, and from a sheet metal section 48, which connects inwardly in radial direction 20 on ring gear 46, and is connected rotationally fixed inwardly in radial direction 20 to inner ring 30.

Drive gear 38 functions for torque transmission between output side 10 of drive unit 8 and outer ring 28. Drive gear 38 is thereby mounted inwardly in radial direction 20 rotationally fixed on output shaft 12 forming output side 10 of drive unit 8, whereas a section of drive gear 38 situated outward in radial direction 18 is mounted rotationally fixed on outer ring 28 with the interposition of second side wall 42.

First side wall 40 limits clamping gap 32 in axial direction 16, whereas second side wall 42 limits clamping gap 32 in axial direction 14 so that in each case a lateral limitation of clamping gap 32 by side walls 40, 42 may be stated. Both first and also second side wall 40, 42 is designed as an essentially annular disk-shaped sheet metal part such that it has an inner edge 50, 52 oriented inward in radial direction 20 and an outer edge 54, 56 oriented outward in radial direction 18. An outer section of first side wall 40 in radial direction 18 is mounted rotationally fixed on the side of outer ring 28 oriented in axial direction 16, whereas a section of second side wall 42 oriented outward in radial direction 18 is mounted rotationally fixed on the side of outer ring 28 oriented in axial direction 14. First side wall 40 has an inner side 58 facing clamping gap 32, whereas second side wall 42 has an inner side 60 facing clamping gap 32. In addition, outer ring 28 has a running surface 62 facing clamping gap 32 and oriented inward in radial direction 20, whereas inner ring 30 has a running surface 64 facing clamping gap 32 and oriented outward in radial direction 18. Clamping element 34, which is preferably designed as a clamping roller, is supported or supportable in radial direction 18 on running surface 62 and in radial direction 20 on running surface 64, wherein running surface 62—as is evident from FIG. 2—has a course which deviates from a circular shape, whereas running surface 64 has a circular course.

Clamping element 34 is—as is evident in FIG. 2—biased in circumferential direction 24 by means of a spring element 66. Spring element 66, designed as accordion spring 68, is thereby supported or supportable in circumferential direction 24 on clamping element 34 and in circumferential direction 22 on a support projection 70. Support projection 70 has a support section 72, which is arranged in clamping gap 32 and which is consequently arranged in axial direction 14, 16 between inner sides 58, 60 of side walls 40, 42 and in radial direction 18, 20 between running surface 62 of outer ring 28 and running surface 64 of inner ring 30. Support projection 70 is formed by a supporting tongue 74 bent out from first side wall 40 and projecting into clamping gap 32, wherein the form and design of supporting tongue 74 is to be described in greater detail with reference to FIGS. 3 through 17.

In each case, support section 72 of supporting tongue 74 has a support surface 76 facing clamping element 34 and oriented essentially in circumferential direction 24 and a support surface 78 facing away from clamping element 34 and oriented essentially in circumferential direction 22, which respectively function in the depicted embodiment variant to support spring element 66, designed as accordion spring 68, on supporting tongue 74. In the depicted embodiment variant, a first spring leg 80 of accordion spring 68 is supported or supportable on support surface 76 facing clamping element 34 and a second spring leg 82, adjacent to first spring leg 80, is supported or supportable on support surface 78 facing away from clamping element 34. First and second spring legs 80, 82 of accordion spring 68 are connected to one another via a spring section 84 of accordion spring 68 which bridges support projection 70 in the form of supporting tongue 74 outward in radial direction 18. This spring section 84 may be designed as supported or supportable outward in radial direction 18 on outer ring 28. With respect to accordion spring 68, it is additionally preferred if this is formed from a sheet metal strip with an accordion-shaped or corrugated course.

To effect a secure support of accordion spring 68 on support surfaces 76, 78, support surface 76, 80 facing clamping element 34 and/or facing away from clamping element 34 is designed as uncurved and/or is completely arranged in an uncurved plane. The uncurved plane for support surface 76 and/or support surface 78 is hereby preferably spanned by one axial direction 14, 16 and one radial direction 18, 20 of freewheel 2.

FIGS. 3 through 17, subsequently described, show different embodiments of freewheel 2 from FIGS. 1 and 2, wherein in each case the depiction of spring element 66 is omitted for reasons of clarity. I.e., initially a first embodiment of freewheel 2 is subsequently described for freewheel arrangement 4 according to FIGS. 1 and 2.

Figure 3:
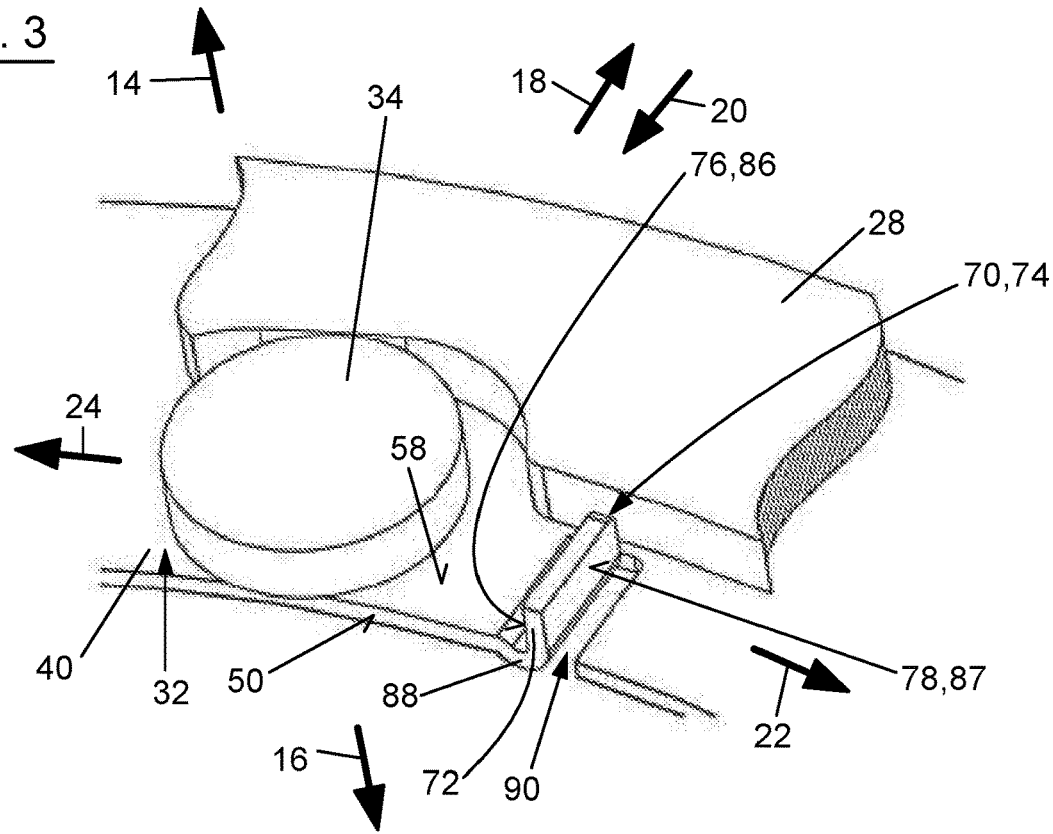
FIG. 3 shows a partial perspective view of the freewheel from FIG. 1 in a first embodiment.
Figure 4:
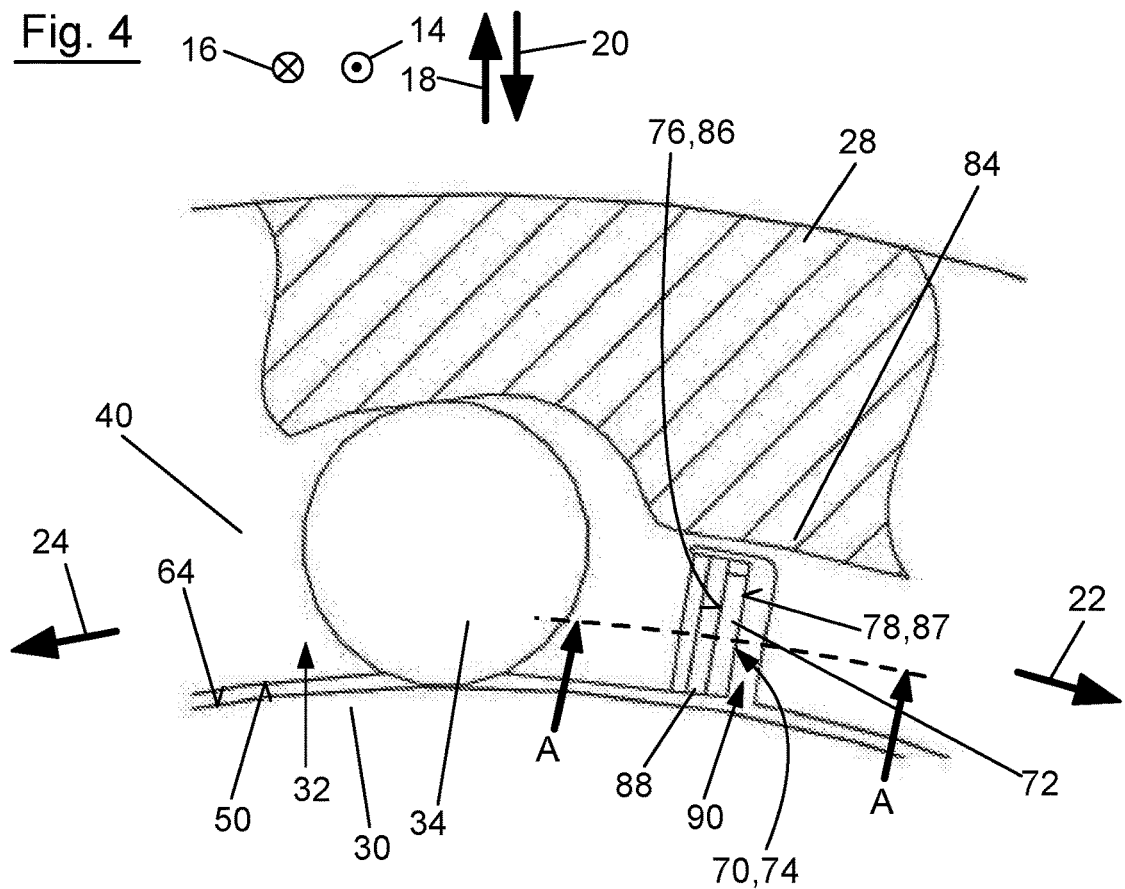
FIG. 4 shows a partial front view of the freewheel from FIG. 3 in a cutaway depiction.
Figure 5:
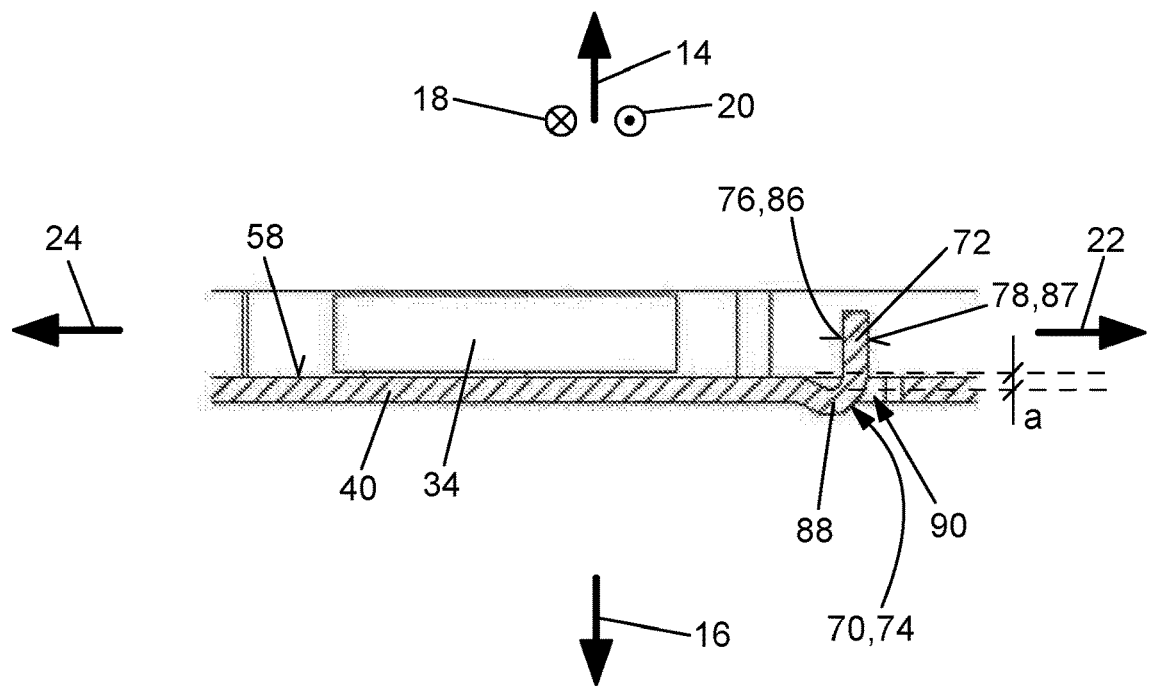
FIG. 5 shows a cross-sectional view along the line A-A in FIG. 4.

In the first embodiment according to FIGS. 3 through 5, supporting tongue 74 is bent in such a way that supporting surface 76 facing clamping element 34 is formed from an upper side 86 of supporting tongue 74, whereas supporting tongue 78 facing away from clamping element 34 is formed from an underside 87 of supporting tongue 74 opposite upper side 86 or facing away from the same. Supporting tongue 74 thereby has a transition section 88, arranged outside of clamping gap 32, and arranged between first side wall 40, on which supporting tongue 74 has its base, and support section 72 of supporting tongue 74 arranged in clamping gap 34, as this is particularly evident in FIG. 5. Transition section 88 is, in contrast to support section 72, not arranged within clamping gap 32; instead, transition section 88 is at least partially recessed with respect to inner side 58 of first side wall 40 facing clamping gap 32, as this is indicated by way of distance a in FIG. 5. Transition section 88 is thereby bent or curved away with respect to inner side 58 of first side wall 40 facing clamping gap 32. In this case, an essentially U-shaped, curved, or circular arc shaped course may be stated. Due to this arrangement of transition section 88, the bend, curve, or arch of the same has no influence on the two support surfaces 76, 78, which are formed exclusively by support section 72 of supporting tongue 74 arranged in clamping gap 32 so that support surfaces 76, 78 are formed uncurved or may be completely arranged in an uncurved plane without a curve of support surfaces 76, 78 endangering a secure support of spring element 66 in the form of accordion spring 68.

As is evident from FIGS. 3 through 5, supporting tongue 74 is bent essentially around a bending axis extending in radial direction 18, 20. Supporting tongue 74 is thereby additionally bent out of first side wall 40 while creating a recess 90 within first side wall 40. As is particularly evident from FIGS. 3 and 4, recess 90 extends up to the inner or outer edge, in this case inner edge 50, of first side wall 40, such that it may be stated that recess 90 is formed as a type of notch at the inner or outer edge, in this case on inner edge 50. By this means, the production of freewheel 2 is simplified, particularly as the cutting out or stamping out of supporting tongue 74 and its bending is facilitated in the shape shown.

In the first embodiment according to FIGS. 3 through 5, recess 90 is arranged essentially inside of first side wall 40 on the side of supporting tongue 74 facing away from clamping element 34, stated more precisely, adjacent to supporting tongue 74 in circumferential direction 22. This has the advantage that the edges of recess 90 are not able to influence the operation of spring element 66 in the form of accordion spring 68, which if necessary is supported or supportable in axial direction 16 on inner side 58 of first side wall 40. In particular, wear on spring element 66 or on the edges of recess 90 may thus also be prevented. Although this arrangement of recess 90 is preferred, it is to be noted at this point that supporting tongue 74 may also be bent out of first side wall 40 in such a way that recess 90 is essentially arranged on the side of supporting tongue 74 facing clamping element 34, stated more precisely, adjacent to supporting tongue 74 in circumferential direction 24.

Figure 6:
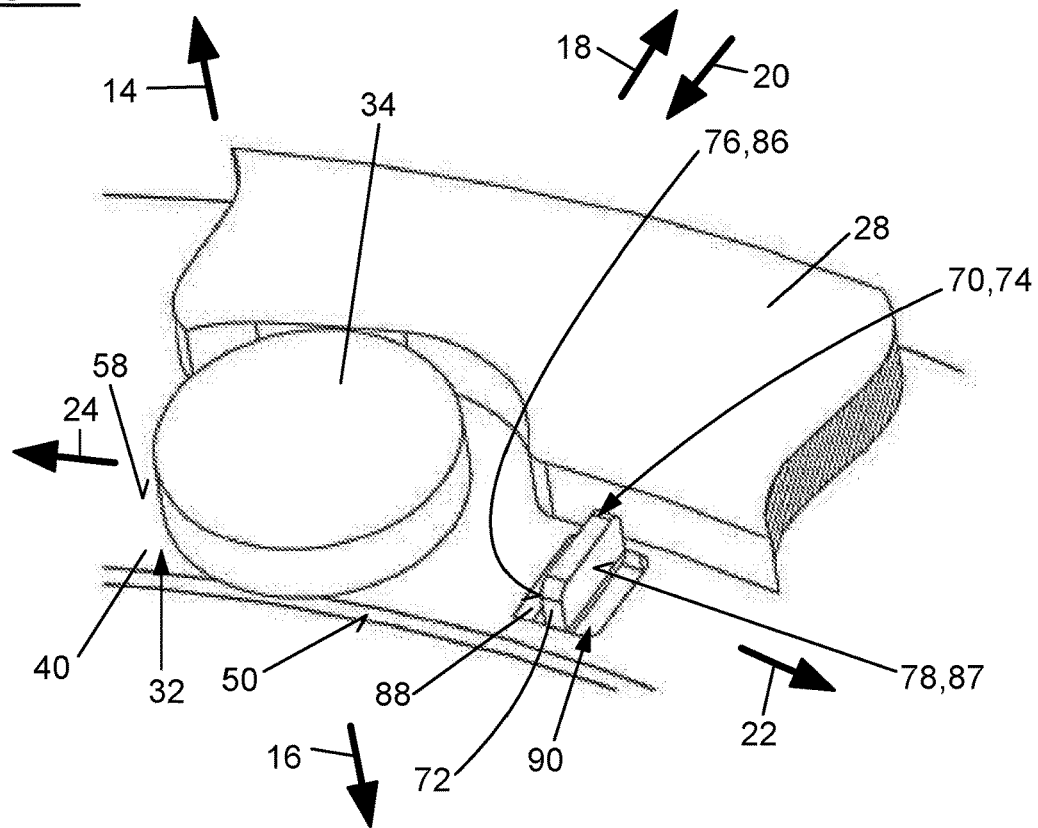
FIG. 6 shows a partial perspective view of the freewheel from FIG. 1 in a second embodiment.
Figure 7:
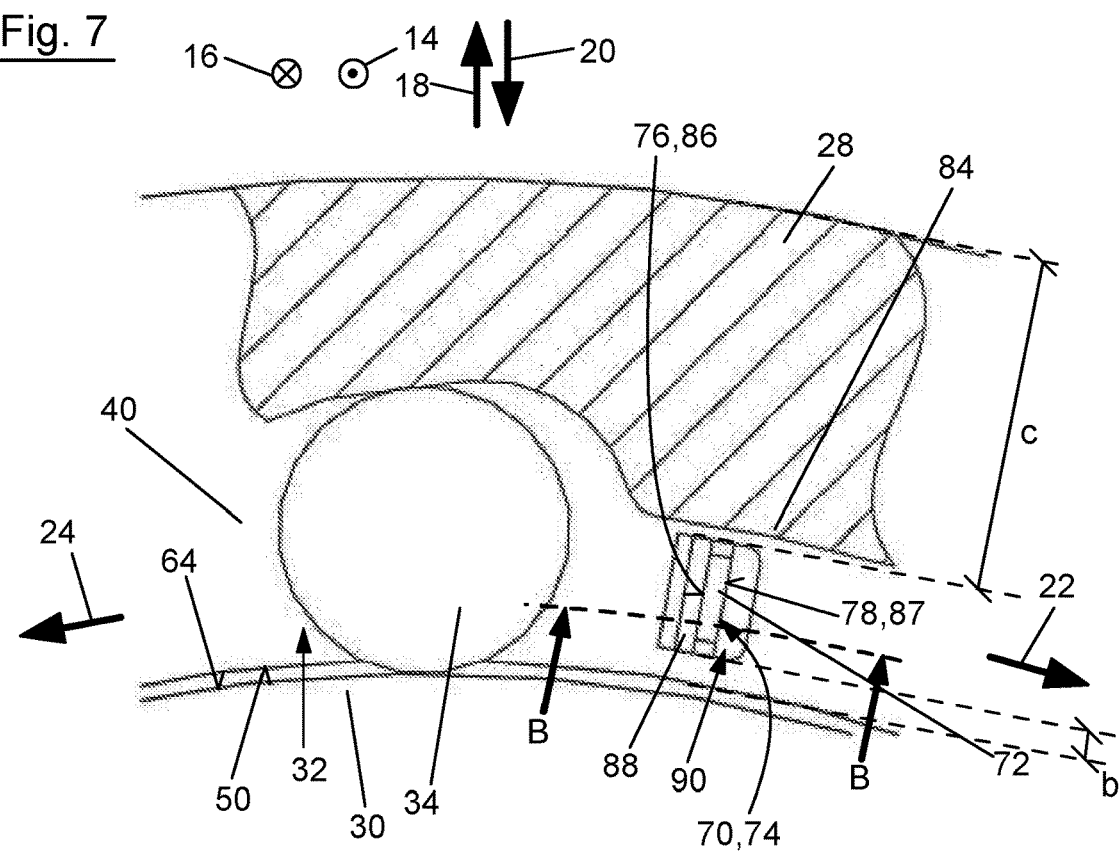
FIG. 7 shows a front view of the freewheel from FIG. 6 in a cutaway depiction.
Figure 8:
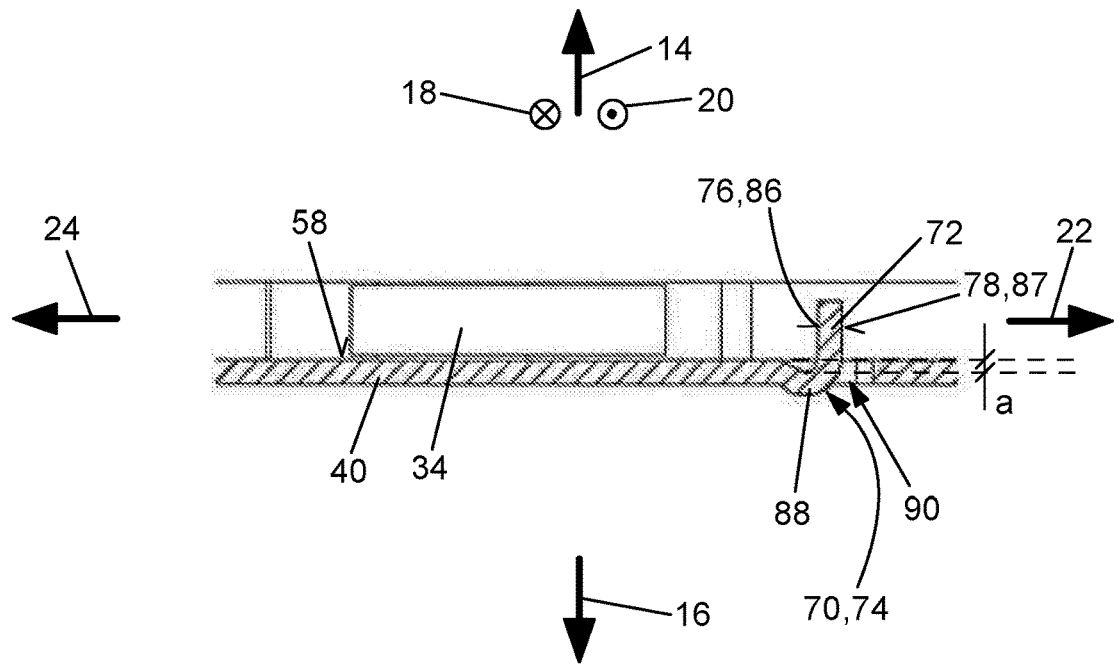
FIG. 8 shows a cross-sectional view along the line B-B in FIG. 7.

FIGS. 6 through 8 show a second embodiment of freewheel 2 for freewheel arrangement 4 according to FIGS. 1 and 2, wherein the second embodiment essentially corresponds to the first embodiment according to FIGS. 3 through 5, such that subsequently only the differences shall be addressed; identical reference numerals are used for identical or similar parts and the previous description correspondingly generally applies.

In the second embodiment, previously-mentioned recess 90 is spaced at a distance both from inner edge 50 and also from outer edge 54 of side wall 40, so that a window-like recess 90 may be stated. I.e., in FIG. 7, the distance between inner edge 50 of first side wall 40 and recess 90 is indicated by way of reference b, whereas the distance between outer edge 54 of first side wall 40 and recess 90 is indicated by way of reference c. The advantage of this second embodiment consists in that a particularly stable first side wall 40 may be created due to window-like recess 90.

Figure 9:
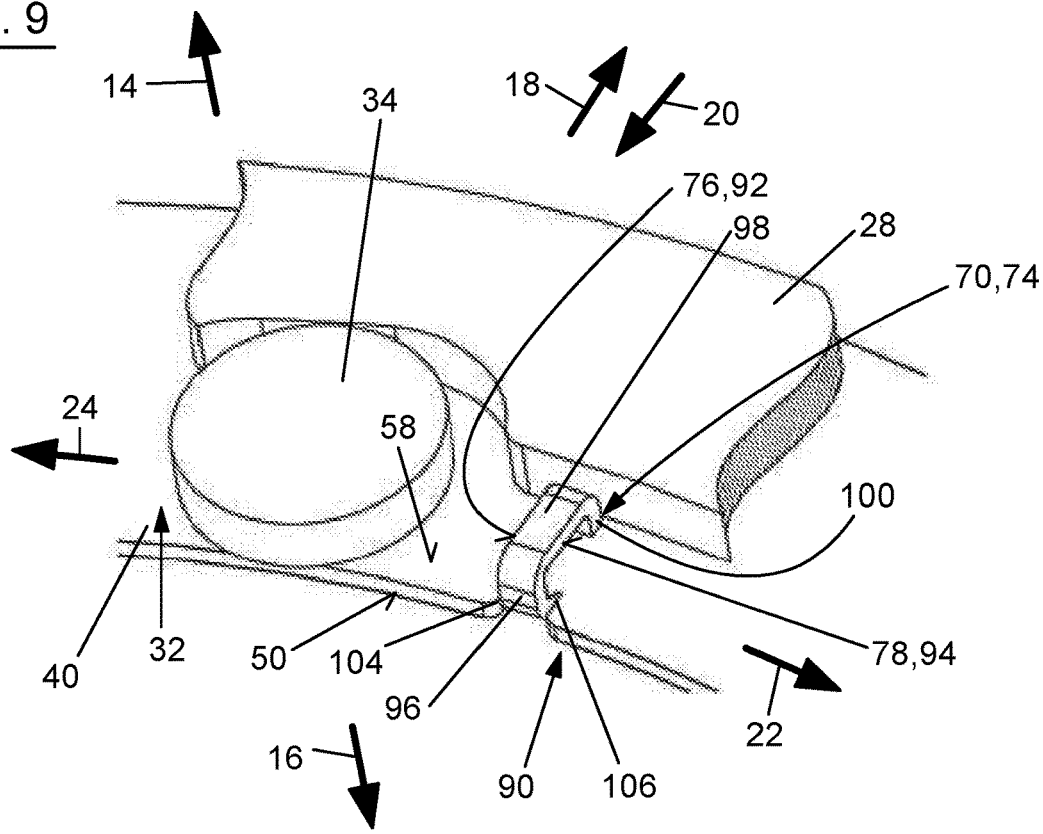
FIG. 9 shows a partial perspective view of the freewheel from FIG. 1 in a third embodiment.
Figure 10:
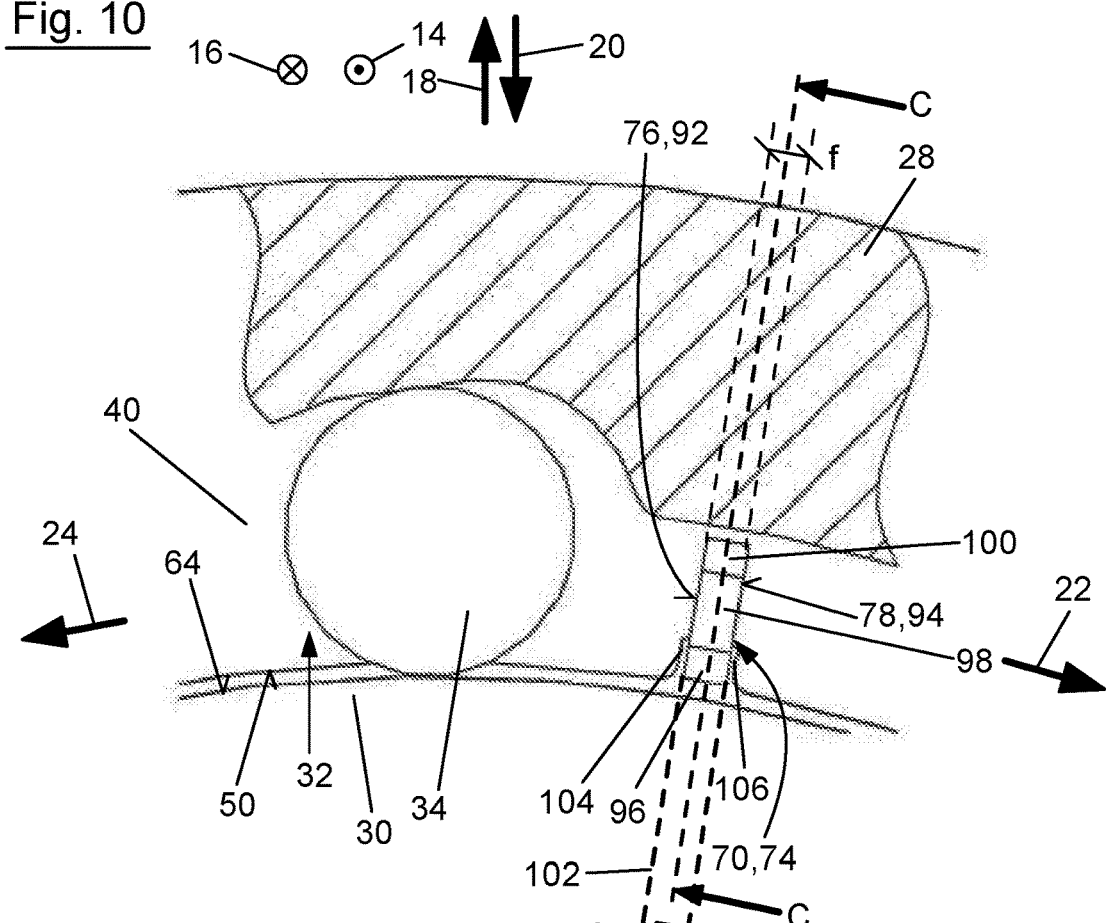
FIG. 10 shows a front view of the freewheel from FIG. 9 in a cutaway depiction.
Figure 11:
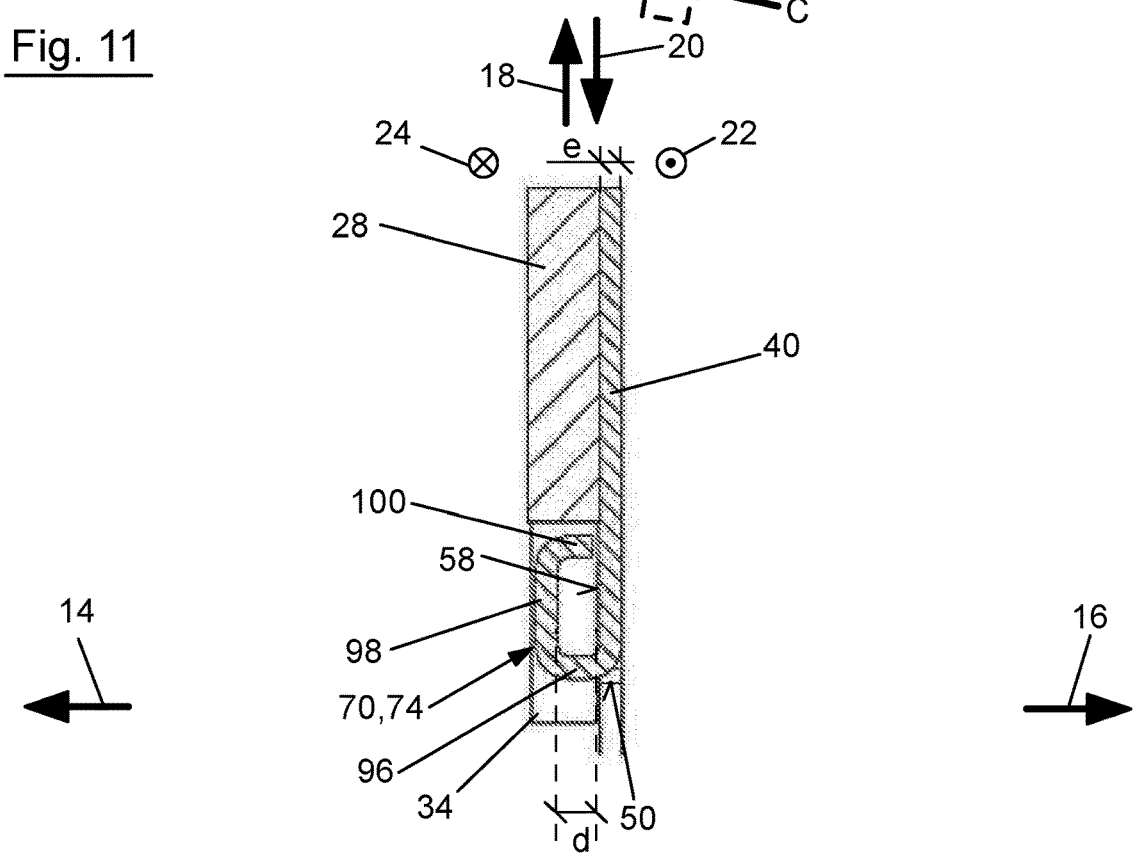
FIG. 11 shows a cross-sectional view along line C-C in FIG. 10.

FIGS. 9 through 11 show a third embodiment of freewheel 2 for freewheel arrangement 4 according to FIGS. 1 and 2. Subsequently, only the special features of the third embodiment are addressed; identical reference numerals are used for identical or similar parts and the previous description correspondingly generally applies according to FIGS. 1 and 2.

In the third embodiment, supporting tongue 74 is bent in such a way that support surface 76 facing clamping element 34 is formed from a side edge 92 of supporting tongue 74, whereas supporting surface 78 facing away from clamping element 34 is formed from a side edge 94 of supporting tongue 74 opposite side edge 92 in circumferential direction 22, wherein upper and lower sides 86, 87 of supporting tongue 74, already described with reference to FIGS. 3 through 8, do not function, or at most function only partially to form support surfaces 76, 78. Supporting tongue 74 has—as is particularly evident from FIGS. 9 and 11—a first section 96 projecting over inner side 58 of first side wall 40 facing clamping gap 32 and a second section 98, connecting to first section 96, extending essentially in radial direction 18, 20. As is evident from FIG. 11, second section 98 is thereby space apart from inner side 58 of first side wall 40, as this is indicated by way of distance d. In addition, supporting tongue 74 has a third section 100 connecting to second section 98. Third section 100 extends essentially in the direction of inner side 58 of first side wall 40, wherein the end of third section 100 may be spaced apart from inner side 58 of first side wall 40, as this is indicated in FIG. 11. However, it may likewise be advantageous if the end of third section 100 is supported on inner side 58 of first side wall 40 to create a particularly stable supporting tongue 74.

Supporting tongue 74 of the third embodiment according to FIGS. 9 through 11 is bent out of first side wall 40 essentially around a bending axis extending in circumferential directions 22, 24. Within the context of production, supporting tongue 74 was thereby shaped or bent out of a tongue 102 projecting in radial direction 18, 20, in this case in radial direction 20, over the inner or outer edge, in this case inner edge 50, of first side wall 40, as this is indicated in FIG. 10 by dashed lines. In addition, notches 104, 106 are provided in the transition areas between inner edge 50 of first side wall 40 and tongue 102. Notches 104, 106 enable that completely shaped or bent supporting tongue 74—as is particularly evident from FIGS. 10 and 11—may be arranged or is arranged completely in radial direction 18, 20 between inner edge 50 and outer edge 54 of first side wall 40. This also includes embodiments in which completely bent or shaped supporting tongue 74 ends at inner or outer edge 50, 54 of first side wall 40. In each case, a radial projection of supporting tongue 74 in radial direction 20 beyond inner edge 50 or in radial direction 18 beyond outer edge 54 is prevented.

First side wall 40 and also supporting tongue 74 have a thickness e, which is indicated in FIG. 11. Whereas in the embodiments according to FIGS. 3 through 8, the distance in circumferential direction 22, 24 between support surfaces 76, 78 corresponds to thickness e of first side wall 40 or of supporting tongue 74, distance f in circumferential direction 22, 24 between support surface 76 facing clamping element 34 and support surface 78 facing away from clamping element 34 is greater than or smaller than thickness e of supporting tongue 74 or of first side wall 40 to create a particularly compact supporting tongue 74 in the case of a smaller distance f, and a particularly stable supporting tongue 74 in the case of a greater distance f. As is evident from FIGS. 9 and 10, distance f in the third embodiment is greater than thickness e of supporting tongue 74 or of first side wall 40.

Figure 12:
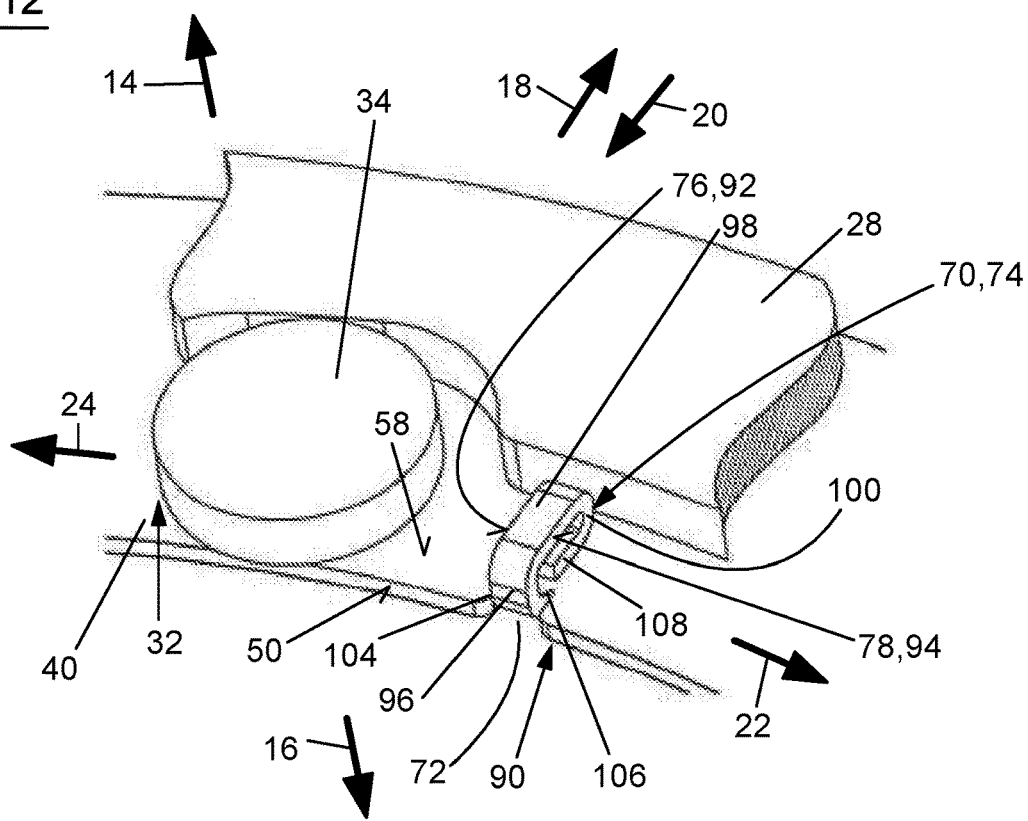
FIG. 12 shows a partial perspective view of the freewheel from FIG. 1 in a fourth embodiment.
Figure 13:
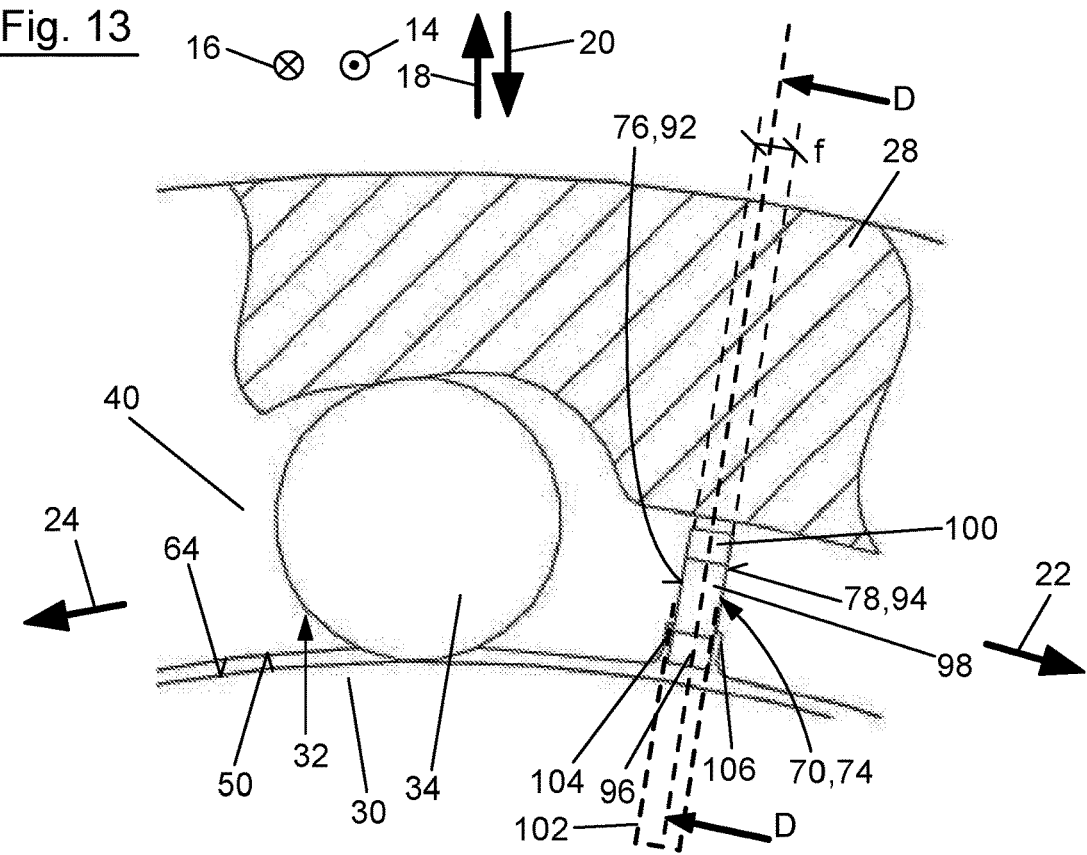
FIG. 13 shows a front view of the freewheel from FIG. 12 in a cutaway depiction.
Figure 14:
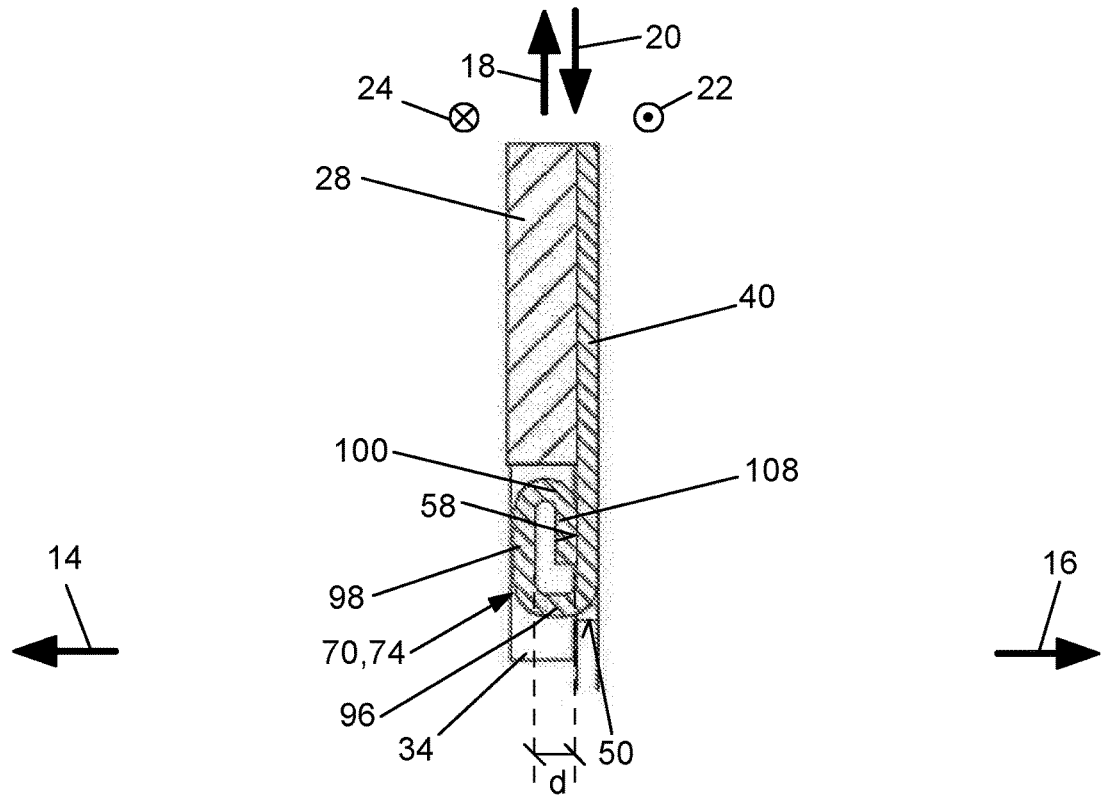
FIG. 14 shows a cross-sectional view along line D-D in FIG. 13.

FIGS. 12 through 14 show a fourth embodiment of freewheel 2 for freewheel arrangement 4 according to FIGS. 1 and 2, wherein the fourth embodiment essentially corresponds to the third embodiment, so that subsequently only the differences shall be addressed; identical reference numerals are used for identical or similar parts and the previous description correspondingly generally applies.

In the fourth embodiment, supporting tongue 74 additionally has a fourth section 108 connecting to third section 100. Fourth section 108 extends, starting from third section 100, in radial direction 20 between second section 98 and first side wall 40, wherein fourth section 108 is supported or supportable in the embodiment shown on inner side 58 of first side wall 40. Basically, fourth section 108 might also, however, be spaced apart from inner side 58 of first side wall 40; although a support or supportability is preferred, to provide a particularly stable supporting tongue 74.

Figure 15:
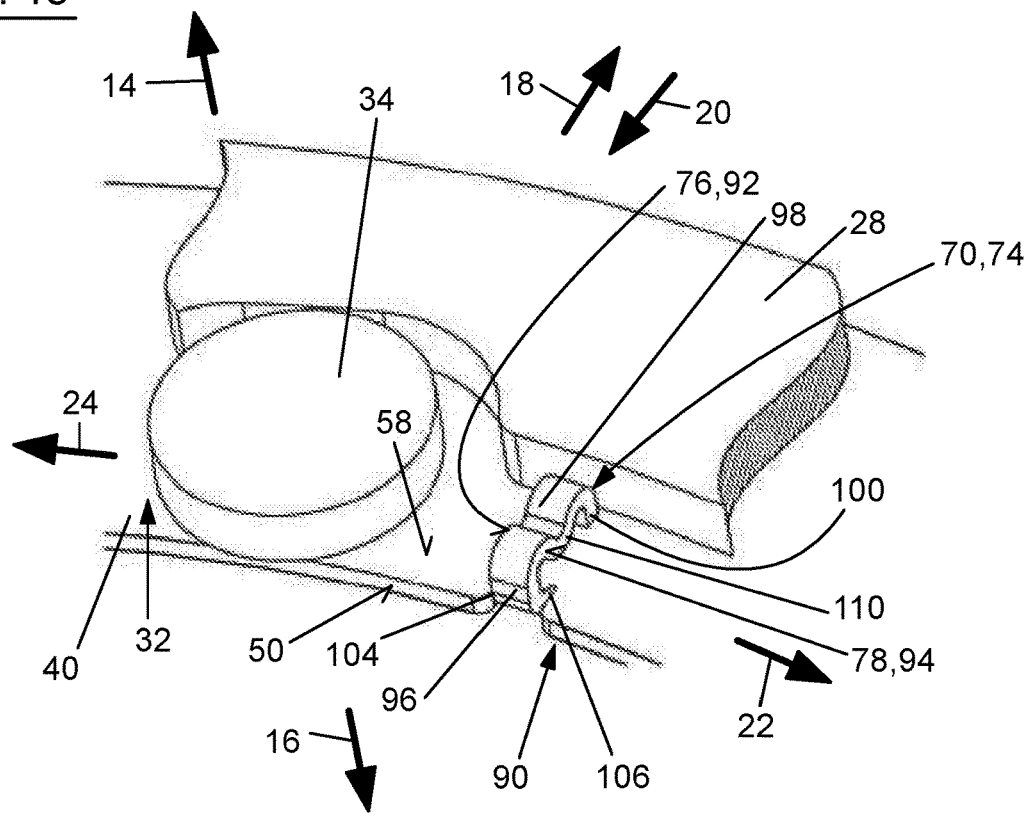
FIG. 15 shows a partial perspective view of the freewheel from FIG. 1 in a fifth embodiment.

FIGS. 15 through 17 show a fifth embodiment of freewheel 2 for freewheel arrangement 4 according to FIGS. 1 and 2, wherein the fifth embodiment essentially corresponds to the third embodiment, so that subsequently only the differences shall be addressed; identical reference numerals are used for identical or similar parts and the previous description correspondingly generally applies.

Whereas side edges 92, 94 in the third embodiment according to FIGS. 8 through 10 extend in the area of second section 98 essentially in a straight line and in radial direction 18, 20, side edges 92, 94 in the fifth embodiment have a course deviating from a straight line in the area of second section 98 of supporting tongue 74, as this is particularly evident in FIGS. 15 and 17. This is effected in the fifth embodiment in that second section 98 of supporting tongue 74 has at least one section 110 curved in axial direction 14, 16. Alternatively, second section 98 may be formed completely curved in axial direction 14, 16. It is also conceivable, even if not preferred, that curved section 110 is supported or supportable on inner side 58 of first side wall 40.

In the case of the fourth embodiment according to FIGS. 12 through 14, side walls 92, 94 might have, alternatively or supplementally, a course deviating from a straight line in the area of fourth section 108 of supporting tongue 74 so that fourth section 108 night be, for this purpose, for example, a section curved in axial direction 14, 16 or formed completely curved in axial direction 14, 16.

Although not shown in the previously-described figures, first side wall 40 might thus also be composed from at least two layers from a first wall facing clamping gap 32 and a second wall facing away from clamping gap 32. In this case, supporting tongue 74 would be bent out of the second wall and formed projecting into clamping gap 32 through a recess in the first wall. It is also conceivable in this embodiment variant, that at least one additional wall of first side wall 40 is arranged between the first and second walls mentioned, wherein in this case, supporting tongue 74 would also extend through a recess in the at least one intermedially-located additional wall of first side wall 40. Alternatively, it is likewise conceivable, to guide supporting tongue 74, bent out of the second wall, radially inward or outward past the first wall, to create a supporting tongue 74, projecting into clamping gap 32, which would not have to extend through a recess in the first wall or one of the additional walls.

The previously described embodiments have the unity that at least first side wall 40, if necessary also the previously-mentioned first and/or second and/or additional wall of first side wall 40, are designed as a sheet metal part, preferably as an annular disk-shaped sheet metal part. It is also evident from the previous description of the embodiments that supporting tongue 74 is respectively designed as one piece with first side wall 40, in the previously-mentioned special case, is formed as one piece with the second wall of first side wall 40.

Within the context of the production of a freewheel 2 according to one of FIGS. 9 through 17, initially an essentially annular disk-shaped sheet metal part is cut or stamped out of a metal sheet, which is to form first side wall 40. The cutting or stamping is thereby carried out in such a way that the essentially annular disk-shaped sheet metal part has multiple tongues 102 projecting over the inner or outer edge 50, 54 of the annular disk-shaped sheet metal part, preferably distributed uniformly in circumferential direction 22, 24, as is indicated with dashed lines in FIGS. 10, 13, and 16. Subsequently, tongue 102 is bent, while creating a supporting tongue 74 projecting over a side of the annular disk-shaped sheet metal part, in this case over inner side 58 of first side wall 40, supporting tongue 74 comprising a support surface 76 oriented in circumferential direction 24 which is formed from a side edge 92 of supporting tongue 74, and/or while creating a supporting tongue 78 oriented in opposite circumferential direction 22 which is formed from a side edge 94 of supporting tongue 74.

Subsequent to this, the sheet metal part forming first side wall 40 may be mounted on the provided outer ring 28 of free wheel 2 while projecting supporting tongue 74 in an area in radial direction 20 inside of outer ring 28.

During the previously-mentioned cutting or stamping out, it is preferred if this is carried out while generating the previously described notches 104 and 106 in the transition area between inner edge 50 of the sheet metal part forming first side wall 40 and tongue 102.

During the bending of tongue 102, it is additionally preferred if this is carried out while at least partially, preferably completely arranging supporting tongue 74 in radial direction 18, 20 between inner and outer edge 52, 54 of the sheet metal part forming first side wall 40, and/or while supporting supporting tongue 74 on the side of the annular disk-shaped sheet metal part, in this case, on inner side 58 of first side wall 40.

Additional embodiments or embodiment variants of the previously outlined method obviously arise for a person skilled in the art from the description of the figures according to FIGS. 9 through 17.

REFERENCES

2 Freewheel
4 Freewheel arrangement
6 Starter
8 Drive unit
10 Output side
12 Output shaft
14 Axial direction
16 Axial direction
18 Radial direction
20 Radial direction
22 Circumferential direction
24 Circumferential direction
26 Axis of rotation
28 Outer ring
30 Inner ring
32 Clamping gap
34 Clamping element
36 Starter wheel
38 Drive gear
40 First side wall
42 Second side wall
44 Output side
46 Outer ring gear
48 Sheet metal section
50 Inner edge
52 Inner edge
54 Outer edge
56 Outer edge
58 Inner side
60 Inner side
62 Running surface
64 Running surface
66 Spring element
68 Accordion spring
70 Support projection
72 Support section
74 Supporting tongue
76 Support surface
78 Support surface
80 First spring leg
82 Second spring leg
84 Spring section
86 Upper side
87 Lower side
88 Transition section
90 Recess
92 Side edge
94 Side edge
96 First section
98 Second section
100 Third section
102 Tongue
104 Notch
106 Notch
108 Fourth section
110 Curved section
a Distance
b Distance
c Distance
d Distance
e Thickness
f Distance

The invention claimed is:

1. A freewheel (2) comprising an inner ring (30), an outer ring (28), a clamping gap (32) between the inner ring (30) and the outer ring (28), a side wall (40) for lateral limitation of the clamping gap (32) and at least one clamping element (34) in the clamping gap (32) which is biased by means of a spring element (66), wherein the spring element (66) is supported or supportable on one side on the at least one clamping element (34) and on another side on a support projection (70), characterized in that the support projection (70) is formed by a supporting tongue (74) bent out of the side wall (40) and projecting into the clamping gap (32).

2. The freewheel (2) according to claim 1, characterized in that a support section (72) of the supporting tongue (74) arranged in the clamping gap (32) has a support surface (76;

78) for the spring element (66) facing the at least one clamping element (34) or facing away from the at least one clamping element (34).

3. The freewheel (2) according to claim 2, characterized in that the supporting tongue (74) is bent is such a way that the support surface (76; 78) facing the at least one clamping element (34) and/or facing away from the at least one clamping element (34) is formed from an upper side (86) and/or from a lower side (87) of the supporting tongue (74).

4. The freewheel (2) according to claim 3, characterized in that the supporting tongue (74) has a transition section (88) arranged between the side wall (40) and the support section (72) outside of the clamping gap (32).

5. The freewheel (2) according to claim 3, characterized in that the supporting tongue (74) is bent out of the side wall (40) while creating a recess (90) in the side wall (40), wherein the recess (90) extends up to the inner or outer edge (52; 54) of the side wall (40).

6. The freewheel (2) according to claim 3, characterized in that the side wall (40) is composed from at least two layers from a first wall facing the clamping gap (32) and a second wall facing away from the clamping gap (32), wherein the supporting tongue (74) is bent out of the second wall and projects into the clamping gap (32) through a recess in the first wall.

7. The freewheel (2) according to claim 2, characterized in that the supporting tongue (74) is bent in such a way that the supporting surface (76; 78) facing the at least one clamping element (34) or facing away from the at least one clamping element (34) is formed from a side edge (92; 94) of the supporting tongue (74).

8. The freewheel (2) according to claim 7, characterized in that the supporting tongue (74) has a first section (96) projecting over an inner side (58) of the side wall (40) facing the clamping gap (32), and a second section (98) connected to the first section (96) and extending essentially in the radial direction (18, 20).

9. The freewheel (2) according to claim 8, characterized in that the side edge (92; 94) of the second section (98) or of the fourth section (108) of the supporting tongue (74) has a course deviating from a straight line, wherein the second or fourth section (98; 108) has at least one section (110) curved in the axial direction (14, 16) or is designed completely curved in the axial direction (14, 16).

10. The freewheel (2) according to claim 7, characterized in that the supporting tongue (74) is bent or shaped from a tongue (102) projecting over the inner or outer edge (50; 54) of the side wall (40) in the radial direction (20, 18), wherein, in a transition area between the inner and outer edge (50; 54) of the side wall (40) and the tongue (102), a notch (104; 106) is provided and the supporting tongue (74) is arranged in the radial direction (18, 20) completely between the inner and outer edge (50, 54) of the side wall (40).

11. The freewheel (2) according to claim 7, characterized in that a distance (f) between the support surface (76) facing the at least one clamping element (34) and the support surface (78) facing away from the at least one clamping element (34) is greater than or smaller than a thickness (e) of the supporting tongue (74) or of the side wall (40).

12. The freewheel (2) according to claim 1, characterized in that the side wall (40), is designed as a sheet metal part or the supporting tongue (74) is designed as one piece with the side wall (40).

13. The freewheel (2) according to claim 1, characterized in that the spring element (66) is supported or supportable on the support surface (76) facing the at least one clamping element (34) or on the support surface (78) facing away from the at least one clamping element (34) and is designed as an accordion spring (68), wherein a first spring leg (80) of the accordion spring (68) is supported or supportable on the support surface (76) facing the at least one clamping element (34), and a second spring leg (82).

14. A method for producing a freewheel (2) according to claim 7 comprising the method steps: cutting or stamping an essentially annular disk-shaped sheet metal part comprising at least one tongue (102) projecting over the inner or outer edge (50; 54) of the annular disk-shaped sheet metal part and uniformly distributed in the circumferential direction (22, 24) out of a metal sheet, and bending the tongue (102) while creating a supporting tongue (74), projecting over a side of the annular disk-shaped sheet metal part, comprising a support surface (76) oriented in the one circumferential direction (24), which is formed from a side edge (92) of the supporting tongue (74), and/or a support surface (78) oriented in the opposite circumferential direction (22) which is formed from a side edge (94) of the supporting tongue (74).

15. The method according to claim 14, in which the sheet metal part is mounted on a provided outer or inner ring (28; 30) of the freewheel (2) with the protrusion of the supporting tongue (74) into an area radially inside of the outer ring (28) or radially outside of the inner ring (30), and/or the cutting or stamping out is carried out while generating a notch (104; 106) in a transition area between the inner or outer edge (50; 54) of the sheet metal part and of the tongue (102) and/or the bending of the tongue (102) is carried out while arranging the supporting tongue (74) in radial direction (18, 20) at least partially between the inner and outer edge (50, 54) of the sheet metal part, and/or while supporting the supporting tongue (74) on the side of the annular disk-shaped sheet metal part.

16. The freewheel according to claim 2, wherein the support surface (76; 78) facing the at least one clamping element (34) or facing away from the at least one clamping element (34) is uncurved and/or is completely arranged in an uncurved plane, wherein the uncurved plane is spanned by an axial direction (14, 16) and a radial direction (18, 20) of the freewheel (2).

17. The freewheel according to claim 4, wherein the transition section (88) is recessed at least partially with respect to the inner side (58) of the side wall (40) facing the clamping gap (32), is bent or arched away, and has essentially a U-shaped, curved, or circular arched course.

18. The freewheel according to claim 5, wherein the recess (90) is designed as a type of notch (104, 106) on the inner or outer edge (52; 54) or is spaced apart from the inner and outer edge (52, 54) of the side wall (40).

19. The freewheel according to claim 18, wherein the recess (90) is also designed as a type of window and is arranged essentially on the side of the supporting tongue (74) facing or facing away from the at least one clamping element (34).

20. The freewheel according to claim 6, wherein the supporting tongue (74) also extends through a recess in at least one additional wall of the side wall (40) arranged between the first and the second wall.

21. The freewheel according to claim 8, wherein the second section (98) of the supporting tongue (74) is spaced apart from the inner side (58) of the side wall (40), wherein the supporting tongue (74) has a third section (100) connecting to the second section (98) extending essentially in the direction of the inner side (58) of the side wall (40).

22. The freewheel according to claim 21, wherein the third section (100) is supported or supportable on the inner side (58) of the side wall (40), and a fourth section (108)

connecting to the third section (100) extending essentially in the radial direction (18, 20) between the second section (98) and the side wall (40).

23. The freewheel according to claim 22, wherein the fourth section (108) is supported or supportable on the inner side (58) of the side wall (40).

24. The freewheel according to claim 12, wherein the first wall and/or the second wall and/or the additional wall of the side wall (40) is also designed as a sheet metal part.

25. The freewheel according to claim 13, wherein the second spring leg (82) is adjacent to the first spring leg (80) and is supported or supportable on the support surface (78) facing away from the at least one clamping element (34), and wherein a spring section (84) is provided between the first and second spring legs (80, 82) which bridges the support projection (70) radially outwardly.

\* \* \* \* \*